(12) United States Patent
Cardoso et al.

(10) Patent No.: US 9,419,317 B2
(45) Date of Patent: Aug. 16, 2016

(54) DETECTING BLOCKAGE OF AIR FLOW THROUGH VEHICLE TRACTION BATTERY

(71) Applicant: Ford Global Technologies, LLC, Dearborn, MI (US)

(72) Inventors: Jesus Cardoso, Allen Park, MI (US); Hsiao-An Hsieh, Troy, MI (US); David Hayes, Northville, MI (US); Beth Ann Dalrymple, Livonia, MI (US); Jason C. Marcath, Dearborn, MI (US); Michael Schamber, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/049,240

(22) Filed: Feb. 22, 2016

(65) Prior Publication Data

US 2016/0167543 A1 Jun. 16, 2016

Related U.S. Application Data

(62) Division of application No. 13/565,851, filed on Aug. 3, 2012, now Pat. No. 9,300,017.

(51) Int. Cl.
| | |
|---|---|
| *H01M 10/66* | (2014.01) |
| *B60L 11/18* | (2006.01) |
| *H01M 10/613* | (2014.01) |
| *H01M 10/625* | (2014.01) |
| *H01M 10/6563* | (2014.01) |
| *H01M 10/48* | (2006.01) |
| *B60H 1/00* | (2006.01) |

(52) U.S. Cl.
CPC .......... *H01M 10/66* (2015.04); *B60H 1/00278* (2013.01); *B60H 1/00978* (2013.01); *B60L 11/1874* (2013.01); *H01M 10/486* (2013.01); *H01M 10/613* (2015.04); *H01M 10/625* (2015.04); *H01M 10/6563* (2015.04); *H01M 2220/20* (2013.01)

(58) Field of Classification Search
CPC . B60L 2240/36; B60L 3/0046; B60L 11/187; B60L 11/1874; H01M 10/66; H01M 10/63; H01M 10/6563; H01M 10/5004; H01M 10/5016; H01M 10/5067; H01M 10/613; H01M 10/625; H01M 10/486
USPC .......................... 180/65.1, 65.21, 68.1, 68.2
See application file for complete search history.

(56) References Cited

U.S. PATENT DOCUMENTS

| | | | | |
|---|---|---|---|---|
| 5,467,006 | A * | 11/1995 | Sims | B60H 1/00642 180/65.1 |
| 6,377,880 | B1 * | 4/2002 | Kato | B60K 6/485 180/65.26 |
| 7,013,659 | B2 | 3/2006 | Yoshida et al. | |
| 7,631,712 | B2 * | 12/2009 | Watanabe | B60K 1/04 180/65.1 |
| 7,735,331 | B2 * | 6/2010 | Zhu | B60H 1/00278 236/49.3 |
| 7,923,141 | B2 | 4/2011 | Okuda et al. | |

(Continued)

*Primary Examiner* — John Walters
(74) *Attorney, Agent, or Firm* — David B. Kelley; Brooks Kushman P.C.

(57) ABSTRACT

Air is supplied from a passenger cabin of a vehicle to an intake passage between the passenger cabin and a battery of the vehicle. The vehicle may be an electric vehicle such as a hybrid electric vehicle (HEV) or a battery-only electric vehicle (BEV). A signal indicating a blockage of air flow through the battery is generated in response to a difference in temperature exceeding a predetermined magnitude. The difference in temperature is between (i) the intake passage and (ii) the passenger cabin.

10 Claims, 3 Drawing Sheets

(56) References Cited

U.S. PATENT DOCUMENTS

| | | | | |
|---|---|---|---|---|
| 8,116,915 B2* | 2/2012 | Kempton | ............ | B60L 11/1824 180/65.1 |
| 8,430,194 B2* | 4/2013 | Yamatani | ........... | B60H 1/00278 180/68.1 |
| 8,536,809 B2* | 9/2013 | Kojima | ............... | B60L 11/1872 180/65.21 |
| 2006/0088738 A1* | 4/2006 | Aso | ................... | H01M 8/04007 429/9 |
| 2008/0257624 A1* | 10/2008 | Kubo | ....................... | B60K 1/04 180/68.1 |
| 2008/0297136 A1* | 12/2008 | Gaboury | ............ | B60H 1/00278 324/76.11 |
| 2009/0090573 A1* | 4/2009 | Boone | ...................... | B60K 6/26 180/65.245 |
| 2009/0173471 A1* | 7/2009 | Sakamoto | .......... | B60H 1/00278 165/41 |
| 2009/0260905 A1* | 10/2009 | Shinmura | ................ | B60K 1/04 180/68.1 |
| 2011/0095623 A1* | 4/2011 | Doh | ....................... | B60L 3/0046 307/119 |
| 2011/0159325 A1* | 6/2011 | Okuda | .................. | B60L 3/0046 429/62 |

* cited by examiner

DETECTING BLOCKAGE OF AIR FLOW THROUGH VEHICLE TRACTION BATTERY

CROSS-REFERENCE TO RELATED APPLICATIONS

This application is a divisional of U.S. application Ser. No. 13/565,851, filed Aug. 3, 2012, now U.S. Pat. No. 9,300,017, the disclosure of which is hereby incorporated in its entirety by reference herein.

TECHNICAL FIELD

The present invention relates to cooling the traction battery of a vehicle.

BACKGROUND

A traction battery of a vehicle such as a hybrid electric vehicle (HEV) or a battery-only electric vehicle (BEV) produces heat when releasing and storing electric energy. Thermal management of the battery may improve battery performance and extend battery life.

Air from the vehicle cabin can be used to cool the battery. Typically, a fan is operated to cause air from the cabin to enter an intake passage to the battery, flow across the battery, and exit an exhaust passage from the battery. Blockage of air flow (i.e., reduced or no air flow) can be caused by a passage being blocked or obstructed and/or by the fan having a damaged fan blade or the like. Any of these situations may cause the air flow to be reduced or absent even though the fan is spinning as commanded such that a proper amount of air flow would normally be present.

SUMMARY

An embodiment of the present invention provides a method for operating a vehicle having a passenger cabin and a traction battery. The method includes generating a signal indicating a blockage of air flow through the battery in response to a difference in temperature exceeding a predetermined magnitude. The difference in temperature is between (i) an intake passage disposed between the passenger cabin and the battery and (ii) the passenger cabin.

The method may further include generating a signal indicating that the air flow through the battery is unimpeded when the difference in temperature within the intake passage and within the passenger cabin is less than the predetermined temperature difference magnitude.

The method may further include operating a battery fan to supply the air from the passenger cabin. In this case, the signal indicating blockage of the air flow through the battery may occur when the difference in temperature within the intake passage and within the passenger cabin is greater than the predetermined temperature difference magnitude even though the battery fan is spinning as commanded. The method may further include disabling the signal indication of blockage of air flow through the battery until the battery fan is spinning as commanded or until the battery fan is spinning as commanded for a predetermined amount of time. The battery fan may be within the intake passage or within an exhaust passage. The exhaust passage is between the battery and an exterior of the battery upstream from the intake passage.

The method may further include detecting the temperature within the intake passage using a temperature sensor positioned within the intake passage and detecting the temperature within the passenger cabin using a temperature sensor positioned within the passenger cabin.

Another embodiment of the present invention provides a system for a vehicle having a traction battery. The system includes an intake passage between a passenger cabin and the battery. The system further includes a battery fan for supplying air from the passenger cabin to the battery via the intake passage. The system further includes a controller configured to generate a signal indicating blockage of air flow through the battery when a difference in temperature within the intake passage and within the passenger cabin is greater than a predetermined temperature difference magnitude.

Another embodiment of the present invention provides an electric vehicle. The vehicle includes a traction battery, a passenger cabin, an intake passage between the passenger cabin and the battery, a battery fan for supplying air from the passenger cabin to the battery via the intake passage, and a controller. The controller is configured to generate a signal indicating blockage of air flow through the battery when a difference in temperature within the intake passage and within the passenger cabin is greater than a predetermined temperature difference magnitude.

Additional objects, features, and advantages of embodiments of the present invention will become more readily apparent from the following detailed description when taken in conjunction with the drawings, wherein like reference numerals refer to corresponding parts.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
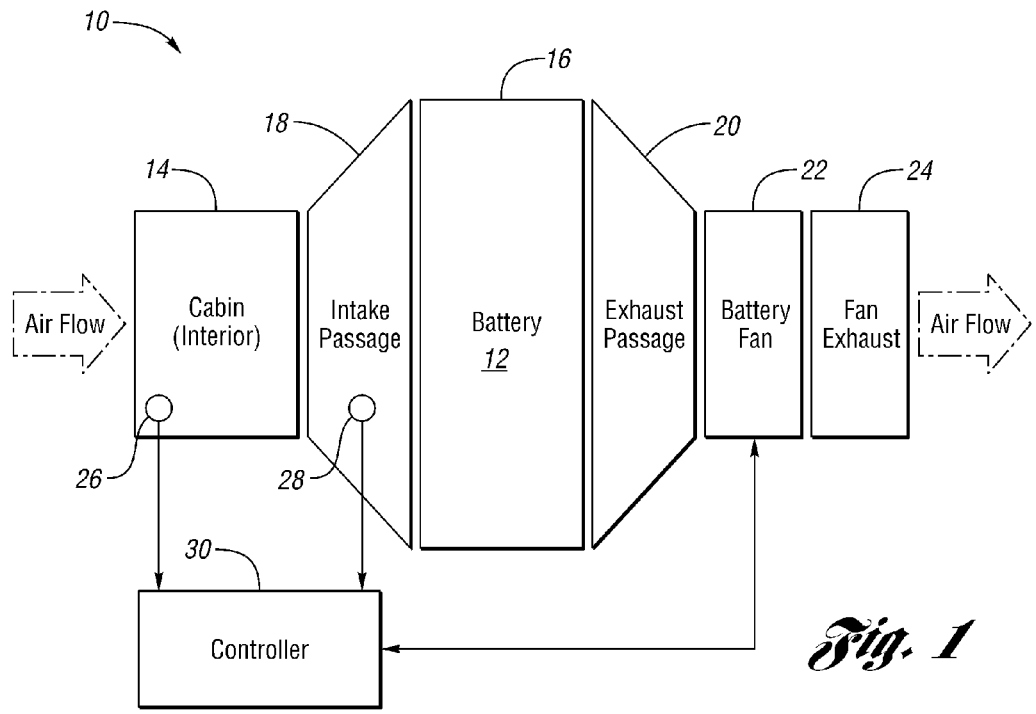
FIG. 1 illustrates a block diagram of a battery cooling system for a traction battery of a vehicle in accordance with an embodiment of the present invention.

Referring now to FIG. 1, a block diagram of a battery cooling system 10 for a traction battery 12 of a vehicle in accordance with an embodiment of the present invention is shown. The vehicle is an electric vehicle such as a hybrid electric vehicle (HEV) or a battery-only electric vehicle (BEV). A HEV includes an engine and an electric motor that are used to drive the vehicle. A BEV is devoid of an engine and has an electric motor that is used to drive the vehicle. In either case, battery 12 stores and releases electrical energy for driving the vehicle and thereby produces heat. Battery cooling system 10 provides thermal management of battery 12 to thereby improve battery performance and extend battery life.

The vehicle includes an interior passenger cabin or compartment 14. Vehicle occupants such as the driver and passengers sit in passenger cabin 14. While the vehicle is being operated, battery cooling system 10 supplies air inside passenger cabin 14 to battery 12 to cool the battery. Battery cooling system 10 supplies air from the interior of passenger cabin 14 to battery 12 without affecting the heating, ventilation, and air conditioning (HVAC) operations of the passenger cabin. In general, air from passenger cabin 14 enters an opening leading to battery 12, flows across or through the battery, and exits an opening leading out from the battery.

Battery cooling system 10 includes a battery case 16 for accommodating battery 12 therein. Battery 12 may include a plurality of unit cells or the like which are contained within battery case 16. Gaps are provided between adjacent unit cells and between the unit cells and the inner surface of battery case 16. The gaps serve for the passage of supplied air through battery 12 from one end to the other.

Battery cooling system 10 further includes intake passage 18. Intake passage 18 is a channel, an inlet, an opening, etc., through which air may pass. For instance, intake passage 18 may be a manifold, an intake duct, or the like. Intake passage 18 (i.e., intake duct 18) is upstream of battery 12. Intake passage 18 is in fluid communication between passenger cabin 14 and an inlet port of battery case 16. Battery cooling system 10 supplies inside air of passenger cabin 14 into battery case 16 via intake passage 18 for cooling battery 12. The inside air of passenger cabin 14 is used as cooling air for battery 12.

Battery cooling system 10 further includes an exhaust passage 20. Again, exhaust passage 20 is a channel, an outlet, an opening, etc., through which air may pass. For instance, exhaust passage 20 is an exhaust duct or the like. Exhaust passage 20 (i.e., exhaust duct 20) is downstream from battery 12. Exhaust passage 20 is in fluid communication between an outlet port of battery case 16 and the exterior of the passenger cabin 14. For instance, exhaust passage 20 is in fluid communication between the outlet port of battery case 16 and the exterior of the vehicle. Via exhaust passage 20, battery cooling system 10 exhausts air (now heated) from battery 12 that was supplied to battery 12 from passenger cabin 14. The exhausted air is discharged from exhaust passage 20 to an exterior environment of passenger cabin 14 such as, for example, the exterior of the vehicle. In another embodiment, exhaust passage 20 includes an air circulation duct through which at least a portion of the air after cooling battery 12 returns to passenger cabin 14.

Battery cooling system 10 further includes a battery fan 22 having a fan exhaust 24. In the embodiment shown in FIG. 1, battery fan 22 with fan exhaust 24 are located upstream of battery 12. In this case, battery fan 22 may be located within exhaust passage 20 with fan exhaust 24 being an extension of exhaust passage 20. Battery fan 24 includes a suction port that is connected to (or a part of) exhaust passage 20. Battery fan 24 functions as an air supply system for supplying the air via intake passage 18 into battery case 16. In particular, when battery fan 24 is operated, the air inside battery case 16 is drawn, whereby the air inside passenger cabin 14 is supplied across battery 12. The air after heat exchange with battery 12 is sent via exhaust passage 20 to battery fan 22 and discharged through fan exhaust 24 to, for instance, the exterior of passenger cabin 14.

Battery cooling system 10 further includes a first temperature sensor 26. First temperature sensor 26 is configured to sense the temperature of the air within passenger cabin 14. To this end, first temperature sensor 26 is located within passenger cabin 14 at a location away from intake passage 18 and exhaust passage 22 (including fan exhaust 24) such that first temperature sensor 26 is not influenced by the temperatures in the vicinity of battery 12. As such, first temperature sensor 26 measures the temperature within passenger cabin 14 that is predominant throughout the passenger cabin.

Battery cooling system 10 further includes a second temperature sensor 28. Second temperature sensor 28 is configured to sense the temperature of the air within intake passage 18. To this end, second temperature sensor 28 is located within intake passage 18. As such, second temperature sensor 28 measures the temperature within intake passage 18 that is predominant throughout the intake passage and outside of battery case 16.

Battery cooling system 10 further includes a controller 30. Controller 30 is configured to obtain the temperature within passenger cabin 14 from first temperature sensor 26. Likewise, controller 30 is configured to obtain the temperature within intake passage 18 from second temperature sensor 28. Controller 30 is further configured to operate and control battery fan 24. Controller 30 provides a commanded fan speed to battery fan 24 with the intention that the fan operate at the commanded fan speed. Controller 30 is further configured to monitor battery fan 24 such that the controller can obtain the actual fan speed of the fan when the fan is operating.

Figure 2:
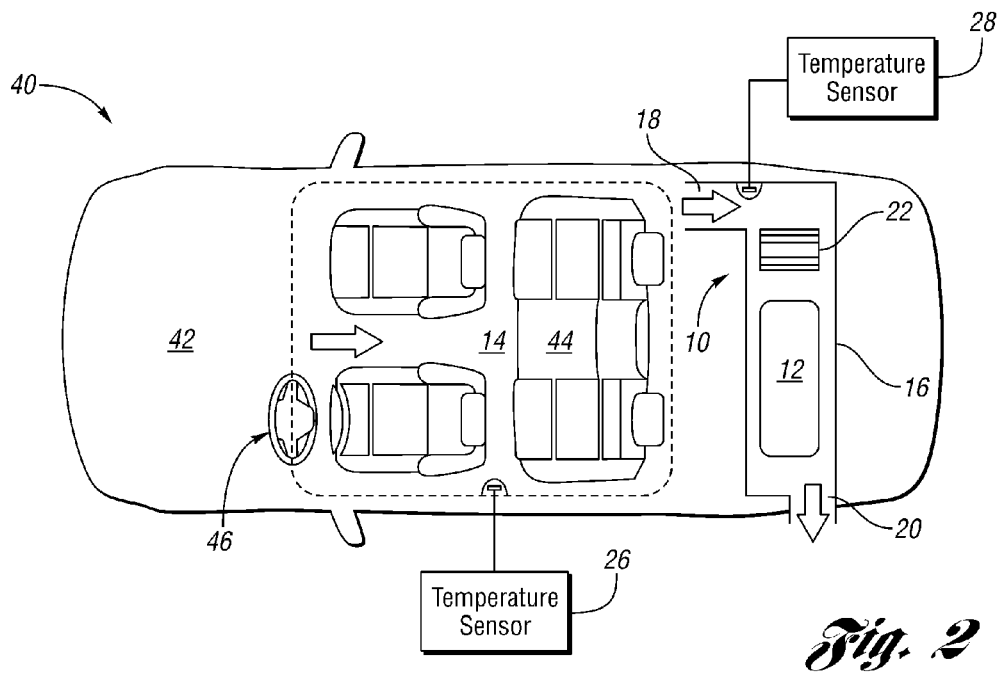
FIG. 2 illustrates a plan view of a vehicle having a traction battery and the battery cooling system.

Referring now to FIG. 2, with continual reference to FIG. 1, a plan view of a vehicle 40 having a traction battery 12 and battery cooling system 10 is shown. Again, vehicle 40 may be a HEV or a BEV or the like. In this embodiment, vehicle 40 is a HEV having an engine which is arranged in an engine compartment 42 in the forward portion of the vehicle. As an exemplary arrangement, battery cooling system 10 and battery 12 are arranged in the rearward portion of vehicle 40. For example, battery cooling system 10 and battery 12 are arranged in a space between a rear seat back 44 within passenger cabin 14 and the trunk. To this end, intake passage 18 is positioned adjacent a portion of the outer periphery of passenger cabin 14 for receiving air of the passenger cabin.

Vehicle 40 includes a HVAC unit 46. HVAC unit 46 has an air conditioner or ventilation unit that supplies cooled air into passenger cabin 14. As described with respect to FIG. 1, battery cooling system 10 supplies air from passenger cabin 14 into battery 12 for cooling the battery.

In the embodiment of battery cooling system 10 shown in FIG. 2, battery fan 22 is located upstream of battery 12 instead of being downstream of the battery as shown in FIG. 1. In particular, battery fan 22 is in fluid communication between passenger cabin 14 and battery case 16. For instance, battery fan 22 is located within intake passage 18. In any event, battery fan 22 in FIG. 2 is configured to blow air into the inlet port of battery case 16. That is, battery fan 22 is configured to draw the inside air of passenger cabin 14 and to supply the drawn inside air to battery 12 in battery case 16. The air after heat exchange with battery 12 is discharged via exhaust passage 20 to the exterior of vehicle 40.

As shown in FIG. 2, battery cooling system 10 includes temperature sensor 26 and temperature sensor 28. Temperature sensor 26 is located in passenger cabin 14 for measuring the temperature within the passenger cabin. Temperature sensor 28 is located in intake passage 18 for measuring the temperature within the intake passage.

As shown, for example, in FIG. 2, intake passage 18 is positioned adjacent a portion of the outer periphery of passenger cabin 14 while being in closer proximity to battery 12. Thus, the temperature within intake passage 18 can be affected relatively more by the temperature of battery 12 than by the temperature of passenger cabin 14. The temperature of battery 12 will often be much higher than the temperature of passenger cabin 14 during operation of the vehicle. Accordingly, if there is a blockage in the air flow through battery 12, then the temperature within intake passage 18 will be higher than the temperature within passenger cabin 14. The temperature difference depends on the degree of the blockage. For instance, the temperature within intake passage 18 will be higher when there is a total blockage in the air flow than when there is a partial blockage in the air flow. In the case of the air flow flowing through battery 12 unimpeded with no blockage, the temperature within intake passage 18 will be lower and closer to the temperature within passenger cabin 14.

Briefly, it is noted that any of intake passage 18, the inlet port of battery case 16, the outlet port of battery case 16, exhaust passage 20, and fan exhaust 24 may have a filter such as a grill or the like. The filter is disposed so that only the air that has passed through the filter can proceed upstream.

Total blockage of air flow (i.e., no air flow) or partial blockage of air flow (i.e., reduced air flow) through battery 12 can be caused by, for example, intake passage 18 or exhaust passage 20 (or fan exhaust 24) being blocked or obstructed. For instance, there may be a foreign object adjacent the grills or within any of the passages that is impeding air flow. Another situation which can result in reduced or no air flow through battery 12 is when battery fan 22 has a damaged fan blade or the like. In any of these situations, battery fan 22 is operating at an actual speed corresponding to the commanded fan speed, but reduced or no air flow through battery 12 occurs. It is desirable to detect the reduction or absence of air flow through battery 12 when battery fan 22 is otherwise operating normally.

Figure 3:
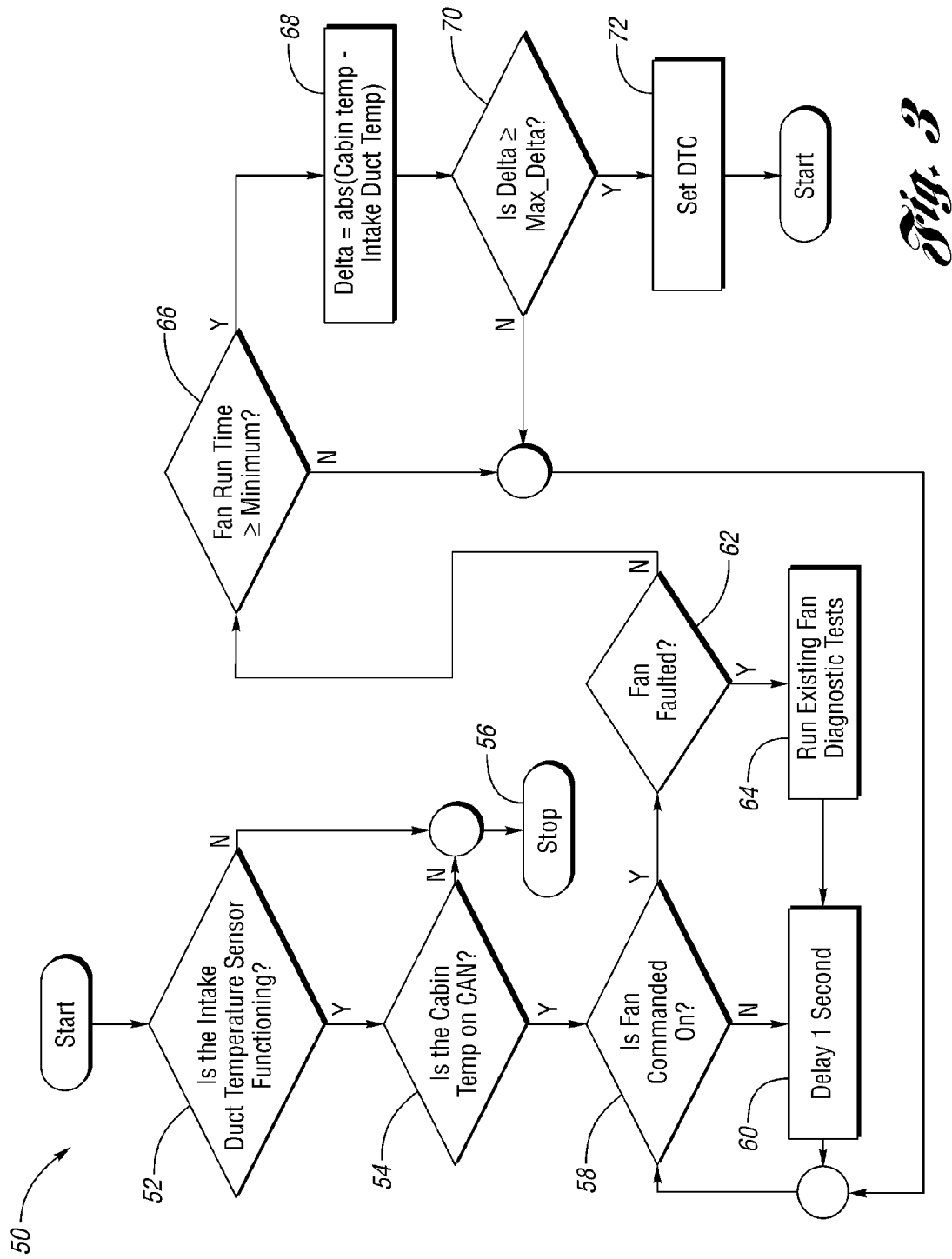
FIG. 3 illustrates a flowchart describing operation of the battery cooling system to detect the reduction or absence of air flow through a traction battery.

Referring now to FIG. 3, with continual reference to FIGS. 1 and 2, a flowchart 50 describing operation of battery cooling system 10 to detect the reduction or absence of air flow through battery 12 is shown. Battery cooling system 10 can detect the reduction or absence of air flow through battery 12 when battery fan 22 is actually running or spinning as commanded.

The operation of battery cooling system 10 includes utilizing the temperature of passenger cabin 14 and the temperature of intake passage 18. The operation may further include utilizing the commanded fan speed and the actual speed of battery fan 22. Battery fan 22 may be located downstream or upstream of battery 12. The operation of battery cooling system 10 is carried out by controller 30.

As shown in flowchart 50, the operation of battery cooling system 10 includes detecting whether the temperature of intake passage 18 (i.e., intake duct 18) is available from temperature sensor 28 as shown in decision block 52. Similarly, whether the temperature of passenger cabin 14 is available from temperature sensor 26 is detected as shown in decision block 54. If any of temperature sensors 26, 28 are not operating properly, then the operation is stopped as shown in block 56.

Assuming the temperatures of intake passage 18 and passenger cabin 14 are available, the next step includes detecting whether battery fan 22 is commanded to spin as shown in decision block 58. This detection is periodically repeated while battery fan 22 is not yet commanded to spin according to block 60.

Once battery fan 22 is commanded to spin, the operation of battery cooling system 10 includes detecting whether battery fan 22 is faulted as shown in decision block 62. This detection may include comparing the commanded spin-speed provided to battery fan 22 from controller 30 with the actual spin-speed of battery fan 22. Thus, if the actual spin-speed is significantly less than the commanded spin-speed, then battery fan 22 is considered faulted. In this case, fan diagnostic tests may be run on battery fan 22 as indicated in block 64 to assist in recovering battery fan 22 to normal operating status.

If the actual spin-speed of battery fan 22 corresponds to the commanded spin-speed provided to battery fan 22, then battery fan 22 is considered in decision block 62 to be operating properly. That is, battery fan 22 is spinning as commanded.

Once battery fan 22 is spinning as commanded, the next step of the operation of battery cooling system 10 includes detecting whether the operating time of battery fan 22 meets a minimum time period threshold as indicated in decision block 66. That is, it is detected in decision block 66 whether battery fan 22 has been operating for a sufficient time such that air flow from passenger cabin 14 through battery 12 would be at a steady state for the air to cool the battery assuming that the air flow is unimpeded.

After battery fan 22 has been operating (i.e., spinning as commanded) for a sufficient time, the operation of battery cooling system 10 includes controller 30 comparing the temperatures of passenger cabin 14 and intake passage 18 as shown in block 68. Controller 30 obtains the respective temperature signals from temperature sensors 26, 28 to obtain the temperatures of passenger cabin 14 and intake passage 18. Controller 30 obtains the difference in absolute magnitude between the temperature of passenger cabin 14 and the temperature of intake passage 18 (i.e., intake duct 18). Controller 30 assigns this difference as being "Delta" as shown in block 68.

Controller 30 then compares Delta (i.e., the difference in absolute magnitude between the temperatures of passenger cabin 14 and intake passage 18) to "max_delta" (i.e., a maximum magnitude difference threshold) as shown in decision block 70. If Delta is larger than max_delta (i.e., if the difference in the absolute magnitude between the temperatures of intake passage 18 and passenger cabin 14 is too large), then controller 30 sets a diagnostic trouble code (DTC) as shown in block 72. Put another way, if the temperature of intake passage 18 exceeds the temperature of passenger cabin 14 by at least a specified amount, then controller 30 sets the DTC. As described herein, the temperature of intake passage 18 will normally exceed the temperature of passenger cabin 14 when the air flow through battery 12 is reduced or absent while battery 12 is being operated when the vehicle is being driven. As further described herein, the air flow through battery 12 may be reduced or absent even through battery fan 22 is spinning as commanded. This latter situation is indicated when controller 30 detects in decision block 70 that the temperature of intake passage 18 exceeds the temperature of passenger cabin 14 by the specified amount after battery fan 22 has been spinning as commanded for a sufficient amount of time.

The DTC in block 72 is an error code that indicates that there is a reduction or absence of air flow through battery 12. Various things may be done in response to the DTC such as, for example, storing a DTC in the controller, illuminating a diagnostic light or code on a vehicle display, sounding an alarm, alerting the driver in some manner, changing or modifying a vehicle control in response to detecting blockage, etc.

Again, the reduction or absence of air flow through battery 12 may be the result of one of passages 18, 20 being blocked or obstructed and/or battery fan 22 being damaged such as by having a damaged fan blade. In any case, the reduction or absence of air flow through battery 12 occurs even though battery fan 22 is spinning as commanded.

Turning back to decision block 70, if Delta is smaller than max_delta (i.e., if the difference in the absolute magnitude between the temperature of intake passage 18 and passenger cabin 14 is not too large), then the temperatures are continually compared again with the steps of blocks 66, 68, and 70 being repeated and no DTC is set. Put another way, if the temperature of intake passage 18 is close to the temperature of passenger cabin 14 such that the temperature of the intake passage is within a predetermined acceptable range of the temperature of the passenger cabin, then the air flow through battery 12 is considered to be unimpeded. As described herein, the temperature of intake passage 18 should be within the predetermined acceptable range of the temperature of passenger cabin 14 when the air flow through battery 12 is unimpeded while battery 12 is being operated when the vehicle is being driven. Thus, in this case, the air flow through battery 12 is unimpeded with battery fan 22 spinning as commanded.

Figure 4A:
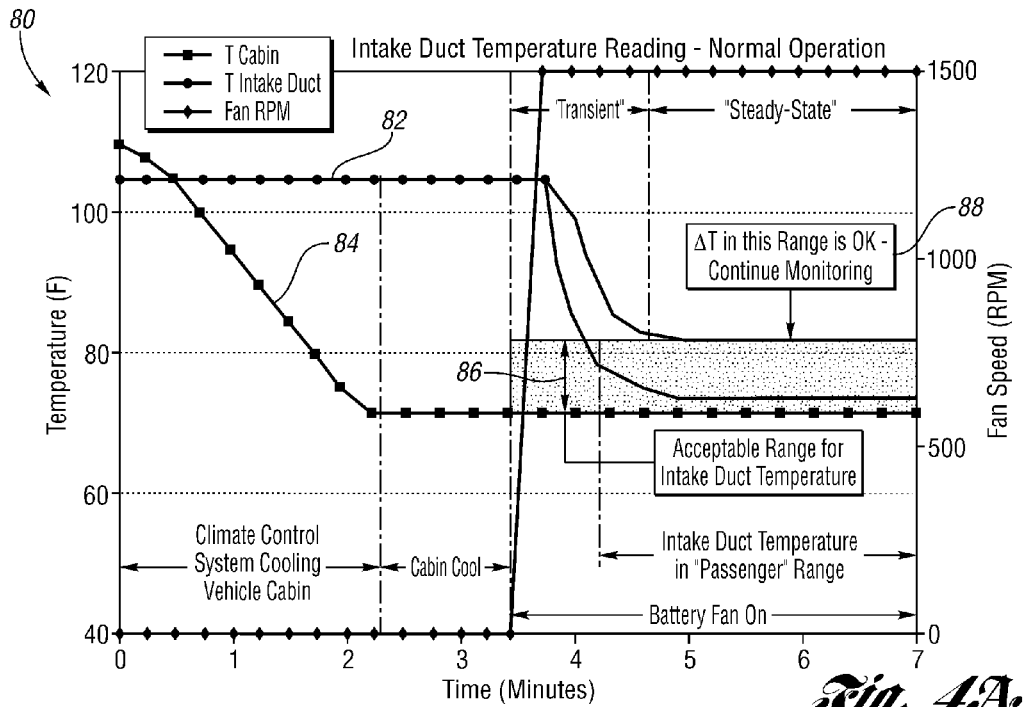
FIG. 4A illustrates a graph depicting operation of the battery cooling system when proper air flow through the traction battery is present.

Referring now to FIG. 4*a*, with continual reference to FIG. 3, a graph 80 depicting operation of battery cooling system 10 when proper air flow through battery 12 is present is shown. In graph 80, the temperature of intake passage 18 over time is represented by temperature plot 82 and the temperature of passenger cabin 14 over time is represented by temperature plot 84. In the case of proper air flow through battery 12 being present, the temperature of intake passage 18 is within an acceptable range 86 of the temperature of passenger cabin 14. That is, the difference in temperature ($\Delta T$) between intake passage 18 and passenger cabin 14 falls within acceptable range 86 as indicated by block 88.

Figure 4B:
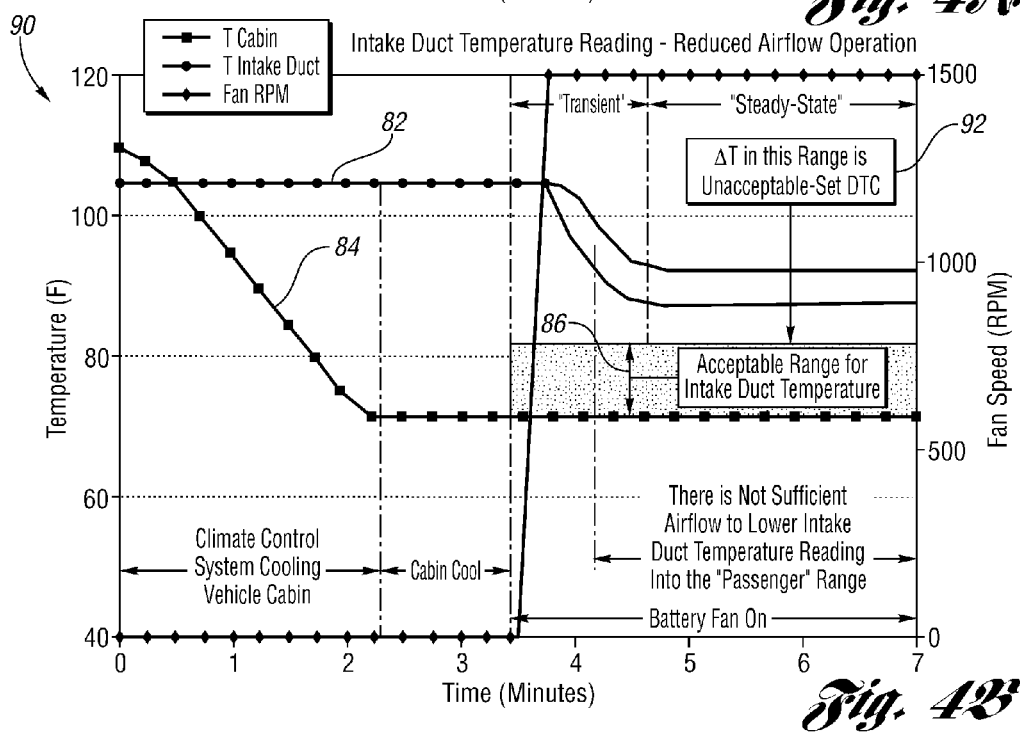
FIG. 4B illustrates a graph depicting operation of the battery cooling system when air flow through the traction battery is relatively small or absent as a result of being blocked.

Referring now to FIG. 4*b*, with continual reference to FIGS. 3 and 4*a*, a graph 90 depicting operation of battery cooling system 10 when air flow through battery 12 is reduced or absent is shown. Again, the temperature of intake passage 18 over time is represented by temperature plot 82 and the temperature of passenger cabin 14 over time is represented by temperature plot 84. In this case of air flow through battery 12 being reduced or absent, the temperature of intake passage 18 is not within acceptable range 86 of the temperature of passenger cabin 14. That is, the difference in temperature difference in temperature ($\Delta T$) between intake passage 18 and passenger cabin 14 does not fall within acceptable range 86 as indicated by block 92.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method for operating a vehicle having a passenger cabin and a traction battery, the method comprising:
    generating a signal indicating a blockage of air flow through the traction battery in response to a difference in temperature exceeding a predetermined magnitude, wherein the difference in temperature is between (i) an intake passage disposed between the passenger cabin and the traction battery and (ii) the passenger cabin.

2. The method of claim 1 further comprising:
    generating a signal indicating that air flow through the traction battery is unimpeded when the difference in temperature is less than the predetermined magnitude.

3. The method of claim 1 further comprising:
    spinning a fan at a commanded speed to supply air flow from the passenger cabin to the traction battery.

4. The method of claim 3 wherein:
    the difference in temperature exceeds the predetermined magnitude while the fan is spinning at the commanded speed.

5. The method of claim 3 further comprising:
    disabling the signal indicating a blockage of air flow through the traction battery while the fan is spinning at a speed less than the commanded speed.

6. The method of claim 5 further comprising:
    disabling the signal indicating a blockage of air flow through the traction battery until the fan has been spinning at the commanded speed for a predetermined amount of time.

7. The method of claim 3 wherein:
    the fan is disposed within the intake passage.

8. The method of claim 3 wherein:
    the fan is disposed within an exhaust passage between the traction battery and an exterior of the traction battery upstream from the intake passage.

9. The method of claim 1 further comprising:
    detecting the temperature within the intake passage using a temperature sensor positioned within the intake passage.

10. The method of claim 1 further comprising:
    detecting the temperature within the passenger cabin using a temperature sensor positioned within the passenger cabin.

\* \* \* \* \*